United States Patent
Rosenberger (10) Patent No.: US 10,517,459 B2
(45) Date of Patent: *Dec. 31, 2019

(54) BBQ GRILL SCRAPER AND METHOD OF USE

(71) Applicant: Charboss LLC, Elizabethtown, PA (US)

(72) Inventor: Jeffrey Rosenberger, Elizabethtown, PA (US)

(73) Assignee: CHARBOSS LLC, Elizabethtown, PA (US)

( * ) Notice: Subject to any disclaimer, the term of this patent is extended or adjusted under 35 U.S.C. 154(b) by 174 days.

This patent is subject to a terminal disclaimer.

(21) Appl. No.: 15/476,166

(22) Filed: Mar. 31, 2017

(65) Prior Publication Data

US 2017/0203336 A1    Jul. 20, 2017

Related U.S. Application Data

(63) Continuation-in-part of application No. 15/298,571, filed on Oct. 20, 2016, now Pat. No. 9,943,885.

(60) Provisional application No. 62/246,146, filed on Oct. 26, 2015.

(51) Int. Cl.
| | |
|---|---|
| *A47L 17/06* | (2006.01) |
| *A47J 37/07* | (2006.01) |
| *B67B 7/16* | (2006.01) |
| *A47L 13/02* | (2006.01) |
| *A47J 43/28* | (2006.01) |
| *A47L 13/08* | (2006.01) |
| *A47L 13/022* | (2006.01) |

(52) U.S. Cl.
CPC ........... *A47L 17/06* (2013.01); *A47J 37/0786* (2013.01); *A47J 43/288* (2013.01); *A47L 13/02* (2013.01); *A47L 13/08* (2013.01); *B67B 7/16* (2013.01); *A47L 13/022* (2013.01)

(58) Field of Classification Search
CPC ........ A47L 13/022; A47L 13/08; A47L 13/06; A47L 17/06; A47L 13/02; A47J 43/288; A47J 37/0786; B67B 7/16
USPC .......................................... 15/236.07, 236.08
See application file for complete search history.

(56) References Cited

U.S. PATENT DOCUMENTS

| | | |
|---|---|---|
| 269,767 A | 12/1882 | Wilson |
| 2,046,599 A | 7/1936 | Andrews |
| 2,747,911 A | 5/1956 | Kuever |
| 3,092,411 A | 6/1963 | Hardy |

(Continued)

FOREIGN PATENT DOCUMENTS

| | | |
|---|---|---|
| CA | 2023273 A1 | 2/1992 |
| CA | 2386483 A1 | 11/2003 |

(Continued)

*Primary Examiner* — Laura C Guidotti
(74) *Attorney, Agent, or Firm* — Carter, Deluca & Farrell LLP (57) ABSTRACT

A barbeque grill scraper that uses a scraping edge with a tooth formed of a wearable material to remove char and debris from the grill grates. The tooth fits between adjoining grill grates to guide the scraping edge and create a plurality of indents in the scraping edge that match the top profile of the grill grates. The grates are thus thoroughly cleaned without the health risks associated with wire brush cleaners. Another embodiment further utilizes a protruding cleaning tool to access and clean the lower sides and bottom of the grill grates.

14 Claims, 7 Drawing Sheets

(56) References Cited

U.S. PATENT DOCUMENTS

| | | | |
|---|---|---|---|
| 3,229,316 A | 1/1966 | Matheson | |
| 3,487,491 A * | 1/1970 | Dunn | A47J 37/06 15/111 |
| D268,215 S | 3/1983 | McBride | |
| D269,767 S | 7/1983 | Houlihan et al. | |
| D324,747 S | 3/1992 | Rood | |
| 5,373,600 A | 12/1994 | Stojanovski et al. | |
| D362,936 S | 10/1995 | Shabel | |
| D363,863 S | 11/1995 | Tipp | |
| D379,256 S | 5/1997 | Tipp | |
| D381,149 S | 7/1997 | Mayo | |
| 5,729,854 A * | 3/1998 | Powers | A47J 37/0786 294/10 |
| 6,039,372 A | 3/2000 | Noe et al. | |
| D426,757 S | 6/2000 | McGrellis | |
| 6,263,578 B1 | 7/2001 | Frantz et al. | |
| 6,276,023 B1 | 8/2001 | Grundy | |
| 6,485,074 B1 * | 11/2002 | Floyd | A47J 37/0786 15/236.01 |
| 6,745,428 B2 | 6/2004 | MacLean | |
| 7,013,524 B1 | 3/2006 | McIlree, Sr. | |
| 7,039,983 B1 | 5/2006 | Outlaw | |
| D537,591 S | 2/2007 | Gringer et al. | |
| D539,105 S | 3/2007 | Bennett | |
| D569,566 S | 5/2008 | Pfitzinger | |
| D624,262 S | 9/2010 | Gringer | |
| D651,485 S | 1/2012 | Michalek | |
| D664,318 S | 7/2012 | Thompson et al. | |
| D664,319 S | 7/2012 | Thompson et al. | |
| D677,847 S | 3/2013 | Thompson et al. | |
| 8,438,687 B2 | 5/2013 | Cybulski et al. | |
| 8,741,068 B2 | 6/2014 | Thompson et al. | |
| D753,890 S | 4/2016 | Zemel et al. | |
| 9,545,173 B2 | 1/2017 | Brown | |
| 9,943,885 B1 * | 4/2018 | Rosenberger | B08B 1/005 |
| 2005/0150070 A1 | 7/2005 | Persichina et al. | |
| 2005/0160544 A1 | 7/2005 | Geller | |
| 2006/0207042 A1 | 9/2006 | Di Paolo | |
| 2009/0031519 A1 | 2/2009 | Carpenter | |
| 2009/0188061 A1 | 7/2009 | Cybulski et al. | |
| 2011/0088265 A1 | 4/2011 | Madren | |
| 2011/0258801 A1 | 10/2011 | Thompson et al. | |
| 2013/0061411 A1 * | 3/2013 | Witzel | A47L 17/00 15/106 |
| 2014/0298606 A1 | 10/2014 | Thompson et al. | |
| 2016/0060884 A1 | 3/2016 | Bernicke-Grussing et al. | |

FOREIGN PATENT DOCUMENTS

| | | |
|---|---|---|
| CA | 2854057 A1 | 9/2015 |
| CN | 202913644 U | 5/2013 |

* cited by examiner

BBQ GRILL SCRAPER AND METHOD OF USE

CROSS-REFERENCE TO RELATED APPLICATIONS

This application is a continuation in part of application Ser. No. 15/298,571 filed on Oct. 20, 2016 which claims the benefit of provisional patent application Ser. No. 62/246,146 filed Oct. 26, 2015 by the present inventor.

FIELD OF THE INVENTION

The present application is related to tools for safely maintaining the appearance and cleanliness of a barbeque grill. More specifically, the present application is directed to a tool for cleaning and removing debris from a cooking grate in a barbeque grill without using wire brushes that create a food-safety hazard.

BACKGROUND

Cooking outdoors on a barbeque (BBQ) grill is very popular. Grills come in a variety of forms, including those fueled by charcoal, wood pellets, or gas. The fuel source produces the heat for cooking and the food is placed on a grate or other partially-open support structure above the heat. During use, charred debris forms on the grate surface of the grill. This charred debris is formed from the foods, such as meat or vegetables, being cooked on the grate surface. The presence of this charred debris can negatively affect the taste and appearance of food being cooked. Debris buildup can also pose a fire hazard. Thus, grill users are encouraged to regularly remove the charred debris. A wide variety of cleaning tools are commercially available for this task, including many brush and scraper tools.

Unfortunately, most commercially-available cleaning tools suffer from a number of drawbacks. Brushes often become clogged with debris and cannot be effectively cleaned. More importantly, metal brushes pose a safety risk to users. Wire bristles can break loose and get into the food.

Ingesting food that contains wire bristles from wire brushes is potentially very dangerous.

Scrapers generally have a ridged scraping surface that can only clean the very top surface of the grill grate, while leaving debris remaining on the sides and bottoms of the grill grate. Scrapers made of metal are better at removing debris but can damage certain grill grates.

SUMMARY

The present invention is directed to a barbeque grill scraper that includes a scraping end made of a material that can wear or conform to the grill grate over time and use, The scraping end includes a scraping edge and a protrusion or "tooth" that fits into the adjoining openings in the grill grate, thus allowing the scraping edge to easily travel in a straight path across the grates.

The tooth keeps the scraping edge from sliding sideways on the grate surface. This keeps the scraping edge locked into place which allows the scraping edge to quickly wear or conform precisely to the grate surface.

The scraping edge is drawn back and forth across a hot grill grate surface to remove char and other debris. The tooth makes it easy for the user to move the scraping edge in a straight line and also assures that the scraping edge contacts the grill grates at the same place every time. Over time, the scraping edge will wear or conform to the grate surface to allow for better cleaning.

In some embodiments to further enhance the cleaning ability, a grate cleaning tool can be attached to the scraping end. The grate cleaning tool is generally I-shaped and attached to the side of the scraping end. It can be used to reach the sides and underside of the grates to clean and loosen debris. Furthermore, the grate cleaning tool can be used to lift up hot grates to retrieve food that has fallen through the grate.

The scraping end is formed of a wearable or conformable material generally selected due to its non-toxic qualities. In some preferred embodiments, the scraping end comprises a suitable wood species, with hardwoods such as oak further preferred. The grill scraper includes a grasping end and can optionally include additional gripping features such as, for example, a reduced body profile or non-slip sleeve or wrap, so as to allow a user to easily grasp and manipulate the grill scraper. In some embodiments, the grasping end can include a hanger that can also function as a bottle opener. In other embodiments, the grasping end can include a through-hole that can serve directly as a hanger or be used to attach a lanyard or the like that can then serve as the hanger. In yet another embodiment, a bottle opener can be attached to the bottom of the grasping end with a recessed area under the opening to allow the bottle cap to engage the bottle opener.

Generally, the scraping end defines a wearable or conformable scraping edge and a tooth. The thickness of the scraping end is reduced to form the scraping edge, while the thickness of the scraping end is maintained in the area of the tooth. The leading edge of the tooth is generally angled.

The scraping end is drawn back and forth across a hot grilling surface to remove debris from the grilling grates. The tooth fits between the openings in the grate and guides the scraping end in a straight line. The scraping edge is guided by the tooth and slides back and forth along the heated grilling surface. Over time and due to friction, abrasion, and heat, grooves or indents are formed in the scraping edge that match the profile of the grill grate. This allows for more than just the upper-most grate surface to be scraped and cleaned of debris.

In some embodiments, the scraping end can be replaceably attached to the grasping end, such that the scraping end can be disposed of and replaced at the end of its useful life.

The above summary of the invention is not intended to describe each illustrated embodiment or every implementation of the present invention.

BRIEF DESCRIPTION OF THE DRAWINGS

The present invention is more completely understood in consideration of the following detailed description of various embodiments in connection with the accompanying drawings, in which.

DETAILED DESCRIPTION OF THE EMBODIMENT(S)

Referring now to the invention in more detail, in FIGS. 1-13 one or more embodiments of the invention are shown. Scraping end 1 is removably or permanently attached to grasping end 11 or formed as a single unit. Scraping edge 3 is formed at the leading edge of scraping end 1 by narrowing the thickness of scraping end 1. Grate cleaning tool 9 is attached to the side of scraping end 1. Hanger 13 is attached near the back of grasping end.

Scraping end 1, in the embodiment shown, is made of wood, such as oak. Grasping end 11 can be made of wood, plastic, metal, or any suitable material that is heat-resistant and easy to grip. Scraping end 1 and grasping end 11 can be a single unit or separate and then attached. Scraping end 1 may be replaceable to extend the useful life of the scraper. Scraping end 1 is narrowed or thinned in thickness to form scraping edge 3. Scraping edge 3 is also made of wood, such as oak and can also be formed of the other suitable materials mentioned above. The profile 4 used to create scraping edge 3 from scraping end 1 can be linear, a conic section, or any profile such to form an edge. In the shown embodiment, a conic section profile is oriented to have the scraping edge 3 along a top major surface 2 of the scraping end 1. The conic section profile extends along an arc from the scraping edge 3 to a bottom major surface 6 of the scraping end 1.

Figure 5:
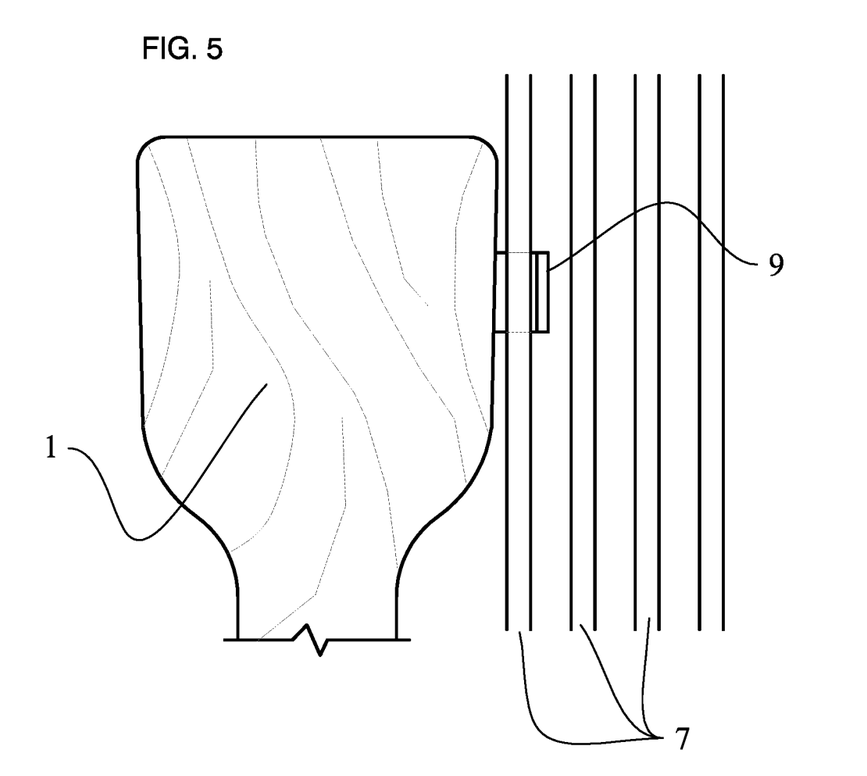
FIG. 5 shows the grate cleaning tool in use.
Figure 6:
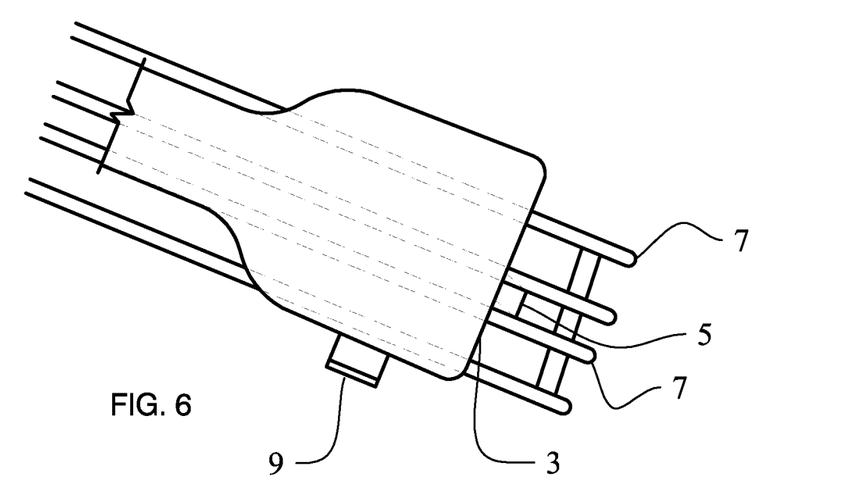
FIG. 6 shows the scraper in use on the grill grate.

Grate cleaning tool 9 is made of metal, such as stainless steel, and is L-shaped with an approximately 90-degree bend. Other materials may be substituted for metal which are not substantially deformable at the typical operating temperatures of a grill. Grate cleaning tool 9 extends tar enough out from scraping end 1 as to allow cleaning of the sides and underside of grill grates. The bent portion of grate cleaning tool 9 allows more effective cleaning by reaching under grill grates 7. Further, it can be used to lift grill grates 7 to retrieve dropped food items.

Figure 7:
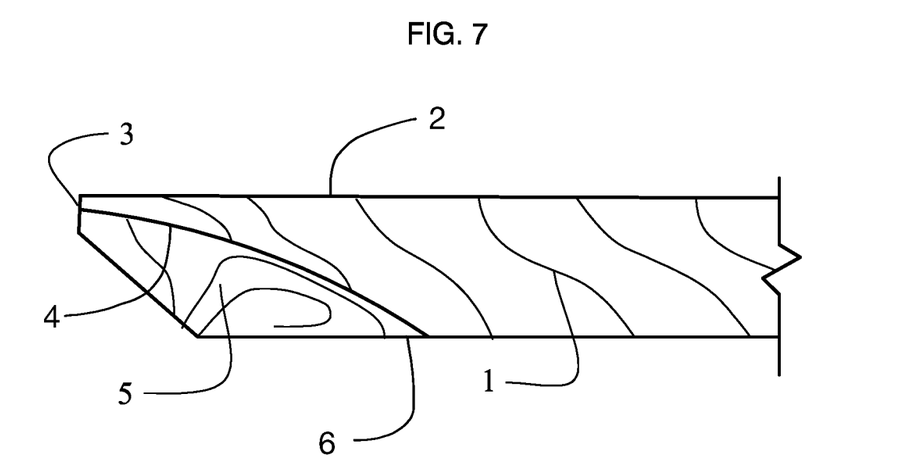
FIG. 7 shows a close-up side view of the scraping end.
Figure 8:
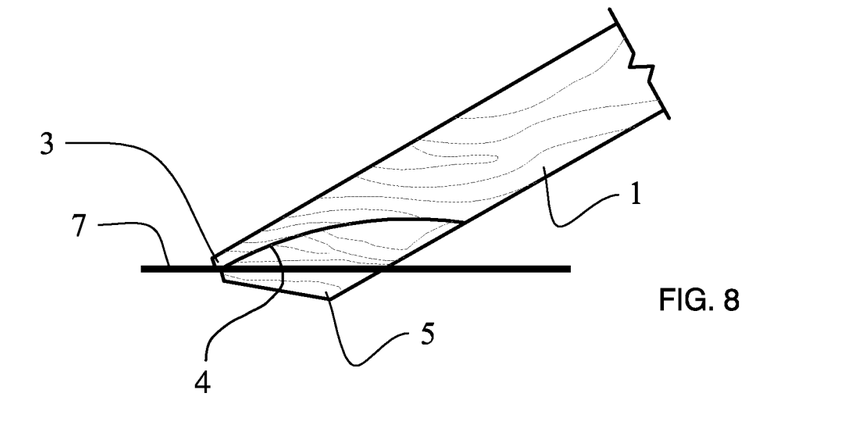
FIG. 8 shows a close-up side view of the scraper in use on the grill grate.
Figure 9:
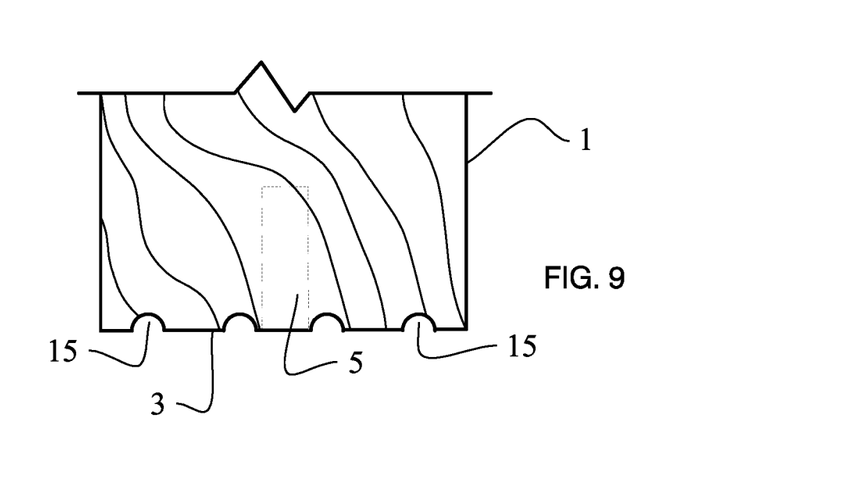
FIG. 9 shows a top view of the scraper after grooves have formed.

Tooth 5 extends below scraping edge 3 and from the arcuate conic section profile 4. Tooth 5 can be formed from scraping end 1 by not narrowing or thinning scraping end 1 in an area where scraping edge 3 is formed. Or tooth 5 can be formed separately and attached to scraping end 1. Tooth 5 is made of wood, metal, or any heat-resistant material. The width of tooth 5 is such that it will fit between adjacent grill grates 7. The leading edge of tooth 5 is angled, rounded, or otherwise eased to more easily ride over any obstructions below grill grates 7. The depth or protrusion of tooth 5 is such that it will extend slightly below the top of grill grates 7 and guide the scraping edge 3 along the top of grill grates 7. Because only one tooth 5 is used, nearly any spacing or configuration of grill grates 7 is compatible.

Figure 1:
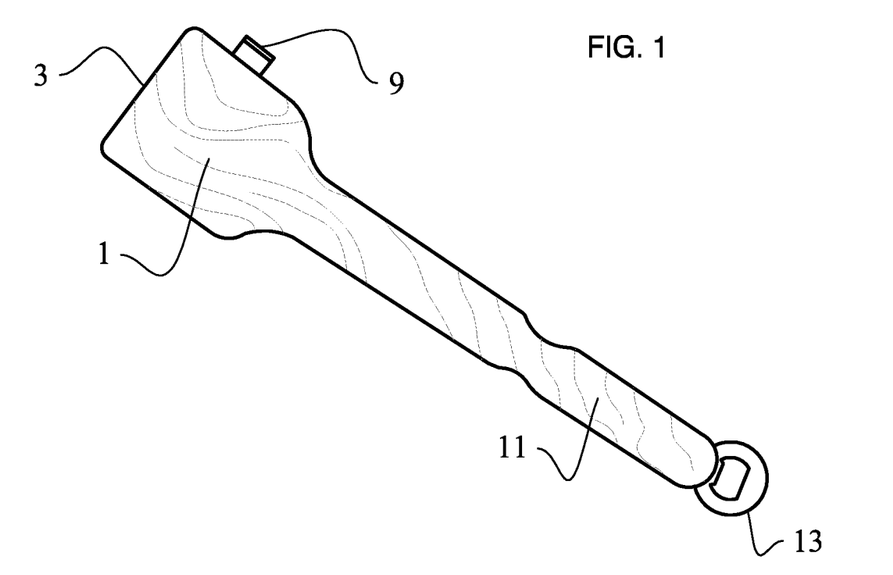
FIG. 1 is a top view.
Figure 2:
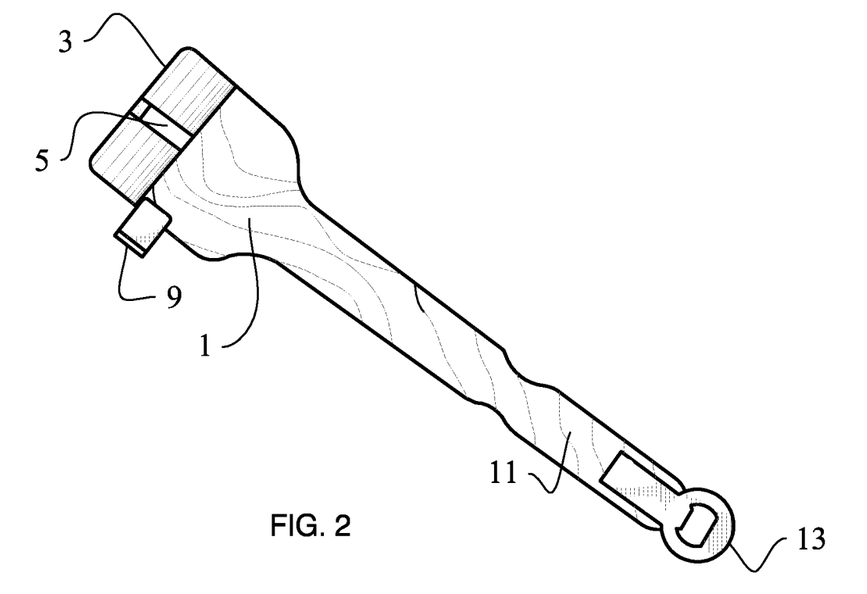
FIG. 2 is a bottom view.
Figure 3:
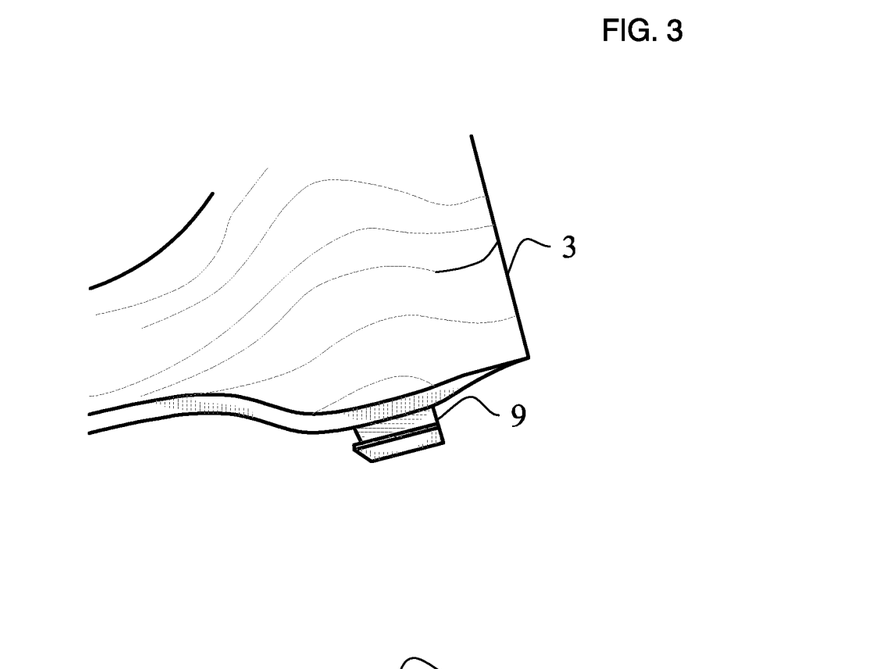
FIG. 3 close-up top view.
Figure 4:
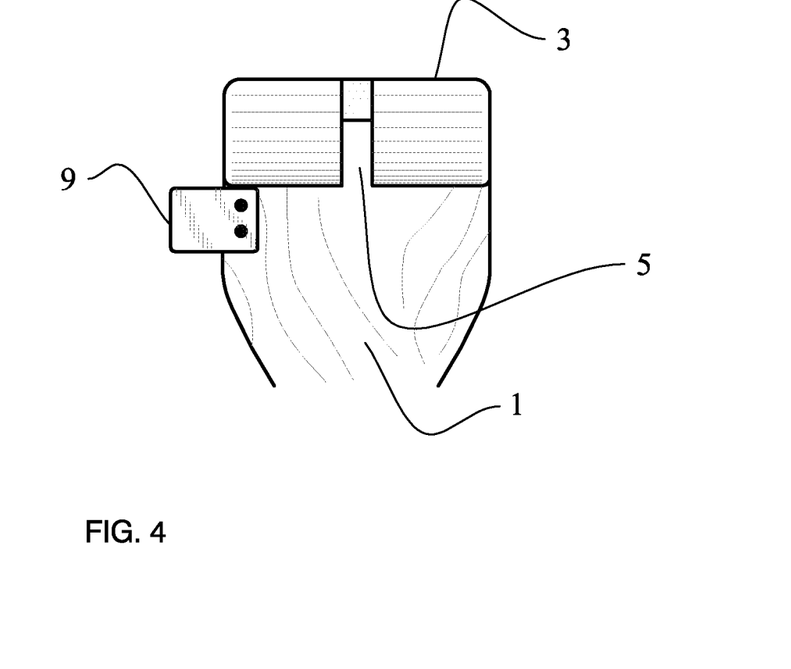
FIG. 4 is a close-up bottom view.

In the embodiment shown, hanger 13 is made of metal. It may alternatively be made of rope or sting or other suitable materials. It is used to hang the scraper from a nail or hook. Hanger 13 can be shaped to allow it to also open bottles such as soda or beer.

Figure 12:
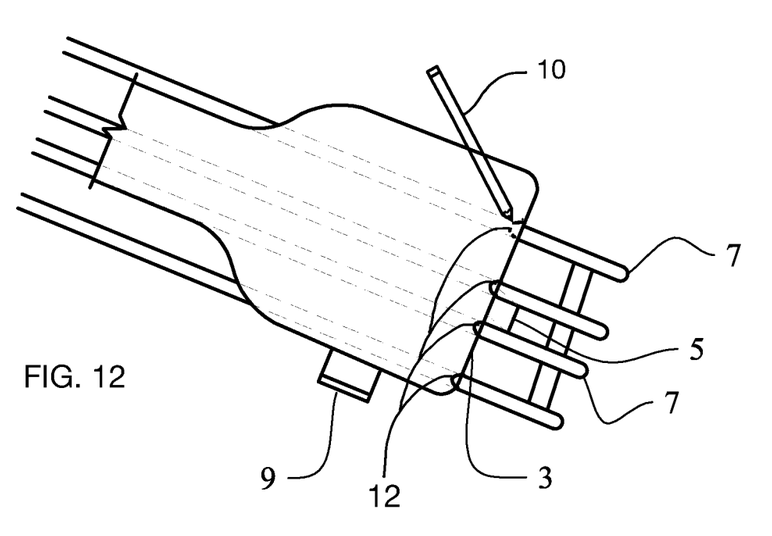
FIG. 12 shows the scraper in use on the grill grate.
Figure 13:
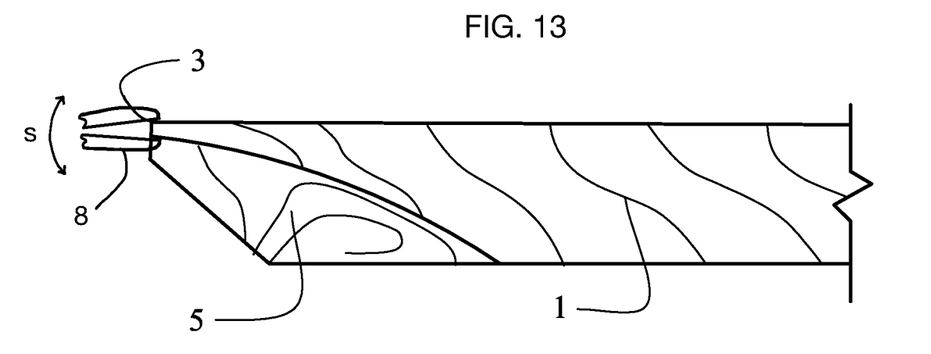
FIG. 13 shows a close-up side view of the scraping end in use.

In use, grasping end 11 is gripped in the user's hand. Tooth 5 is positioned between adjacent grill grates 7. Scraping edge 3 is placed in contact with the top of grill grates 7 at an angle, preferably about 45 degrees above horizontal. Scraping edge 3 is moved back in forth in a straight line along the top of grill grates 7 to remove debris. Tooth 5 guides and controls the path of scraping edge 3. With use of over time, scraping edge 3 wears down and conforms to the profile of grill grates 7 by forming grooves 15. Grooves 15 provide more effective debris removal by contacting not only the top but part of the sides of grill grates 7. Grooves 15 are accurately and easily formed because of tooth 5. Without tooth 5, the user would have to exercise care to align scraping edge 3 with grill grates 7 until after grooves 15 formed. To clean the lower sides and bottom of grill grates 7, grate cleaning tool 9 is moved back and forth between and under grill grates 7. The bent section of grate cleaning tool 9 allows it to reach fully under grill grates 7 to remove debris from the bottom. In an alternate use, to quickly form and conform grooves 15 to the profile of the grill grates 7, first, before heating the grill, as shown in FIG. 12, the scraping edge 3 is placed in contact with the top of the unheated grill grates 7 at an angle, preferably about 45 degrees above horizontal. Using a pen or pencil 10, the user draws marks 12 on the top surface 2 of the scraping edge 3 at each location where a grill grate 7 crosses the scraping edge 3. The tool is then removed from the grill grates 7 and, as shown in FIG. 13, using a needle nose pliers, snipping or customized cutting tool 8, to grasp portions of the scraping edge 3 while moving it in the directions indicted by arrows S, the user removes small pieces of material from the scraping edge 3 in each of the locations marked thus creating indents in the scraping edge 3 corresponding with the grill grates 7. The shape and positioning of the conic section profile 4 along the top surface 2 advantageously facilitates the removal of small pieces to form the indents in the resultant thin scraping edge 3. The grill, along with its grates 7 is then heated. Tooth 5 is positioned between adjacent grill grates 7 once again and the scraping edge 3 is placed in contact with the top of grill grates 7, preferably about 45 degrees above horizontal. The steps of moving the scraping edge 3 back and forth in a straight line along the top of grill grates 7 as described above to further form grooves 15 to conform them in shape to the grates 7.

Figure 10:
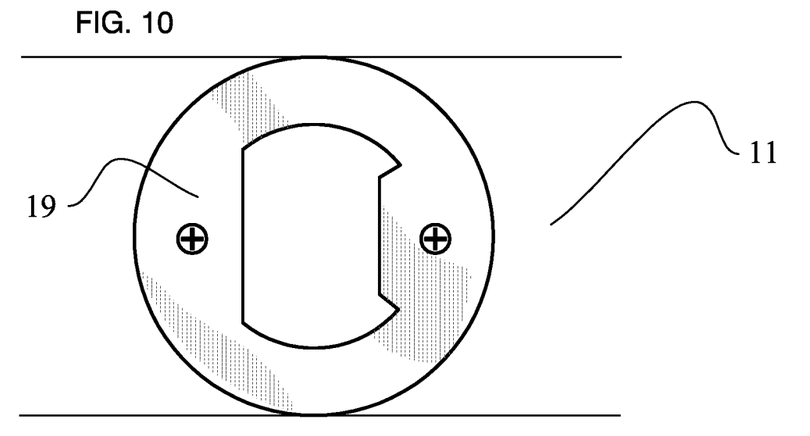
FIG. 10 shows a top view of the recessed bottle opener.
Figure 11:
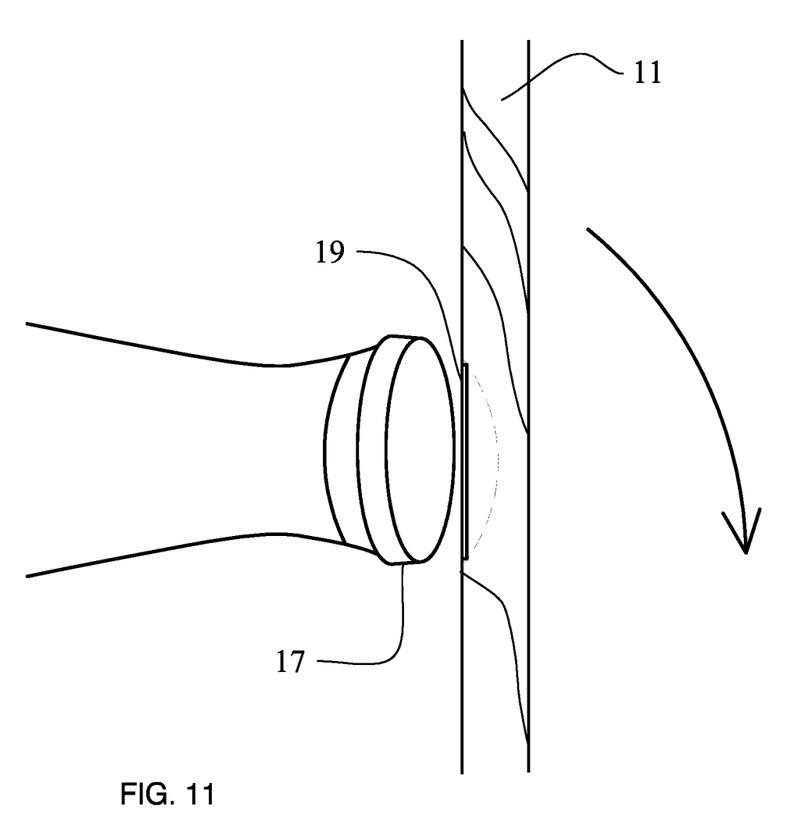
FIG. 11 shows a side view of the recessed bottle opener and bottle cap.

Again referring now to the invention in more detail, in FIGS. 10-11 another embodiment of the invention is shown. Recessed bottle opener 19 is attached to the bottom of grasping end 11.

Recessed bottle opener 19 engages bottle cap 17 and grasping end 11 is rotated to open bottle cap 17. A section of grasping end 11 may be removed from under recessed bottle opener 19 to allow better engagement of bottle cap 17.

In broad embodiment, the present invention is a barbeque grill scraper and cleaner.

While the foregoing written description of the invention enables one having ordinary skill to make and use what is considered presently to be the best mode thereof, those having ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is claimed is:

1. A barbeque grill scraper, comprising:
   a grasping end;
   a scraping end having an arcuate profile along a longitudinal direction between the grasping end and a scraping edge and extending toward a top surface of the scraping end from a bottom surface of the scraping end; and a protrusion extending from a lower surface of the arcuate profile and configured to fit between a pair of adjoining grill grates of a plurality of grill grates, wherein manipulation of the scraping edge along the plurality of grill grates results in the formation of a plurality of grooves in the scraping edge.

2. The barbeque grill scraper of claim 1, wherein a thickness of the scraping end in a direction perpendicular to the longitudinal direction decreases along the arcuate profile.

3. The barbeque grill scraper of claim 2, wherein the scraping edge is a portion of the scraping end having a minimum thickness.

4. The barbeque grill scraper of claim 1, wherein the scraping edge is formed along a leading edge of the scraping end.

5. The barbeque grill scraper of claim 1, wherein the plurality of grooves match a top profile of the plurality of grill grates.

6. The barbeque grill scraper of claim 1, wherein the scraping edge is formed of wood.

7. The barbeque grill scraper of claim 1, further comprising a hanger attached to the grasping end.

8. The barbeque grill scraper of claim 1, further comprising an L-shaped grate cleaning tool attached to the scraping end and extending away from the scraping end.

9. The barbeque grill scraper of claim 1, wherein the scraping end has the bottom surface configured to face the grate and the top and bottom surfaces form the scraping edge.

10. The barbeque grill scrapper of claim 1, wherein the scraping edge is linear.

11. The barbeque grill scrapper of claim 1, further comprising a bottle opener disposed with the grasping end.

12. The barbeque grill scrapper of claim 11, wherein a portion of the grasping end is recessed under the bottle opener.

13. A barbeque grill scraper, comprising:
    a grasping end;
    a scraping end having an arcuate profile forming a scraping edge, the arcuate profile extending along a longitudinal direction between the grasping end and the scraping edge and extending from a bottom surface of the scraping end toward a top surface of the scraping end, the scraping edge being formed from a leading edge of the scraping end; and
    a protrusion extending from a lower surface of the arcuate profile and configured to fit between a pair of adjoining grill grates of a plurality of grill grates, wherein manipulation of the scraping edge along the plurality of grill grates results in the formation of a plurality of grooves in the scraping edge.

14. The barbeque grill scraper of claim 13, wherein the leading edge of the protrusion adjacent the scraping edge is angled or rounded.

* * * * *